No. 804,624. PATENTED NOV. 14, 1905.
G. N. SAEGMULLER.
ILLUMINATING MEANS FOR TELESCOPE CROSS HAIRS.
APPLICATION FILED JAN. 9, 1905.
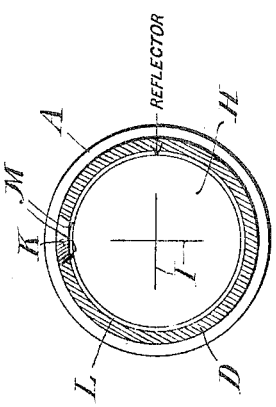
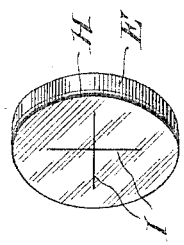
Witnesses
Marshall W. Hines
John L. Saegmuller
Inventor
Geo. N. Saegmuller

UNITED STATES PATENT OFFICE.

GEORGE N. SAEGMULLER, OF WASHINGTON, DISTRICT OF COLUMBIA.

ILLUMINATING MEANS FOR TELESCOPE CROSS-HAIRS.

No. 804,624.          Specification of Letters Patent.          Patented Nov. 14, 1905.

Application filed January 9, 1905. Serial No. 240,239.

*To all whom it may concern:*

Be it known that I, GEORGE N. SAEGMULLER, a citizen of the United States, residing at Washington, District of Columbia, have invented certain new and useful Improvements in Illuminating Means for Telescope Cross-Hairs, of which the following is a specification.

This invention relates to means for illuminating the cross-hairs of telescopes; and the principal object is to provide, in connection with the mounting of said hairs, novel means of a simple nature that will properly reflect and radiate light transversely of the telescope-tube and at the location of the hairs, so that said hairs will be brilliantly and completely illuminated.

The form of structure that is at present considered preferable is illustrated in the accompanying drawings, wherein—

Figure 1 is a longitudinal sectional view through one type of telescope, showing the illuminating means. Fig. 2 is a cross-sectional view on an enlarged scale and on the line 2 2 of Fig. 1. Fig. 3 is a detail perspective view of the lens, the cross-hairs, and the covering therefor.

In the particular type of telescope shown a main tube A is provided, carrying an objective B and a system of erecting lenses C. The end of the tube opposite that having the objective B has an eyepiece-tube D, in which are mounted a field-lens E and an eye-lens F, the latter being preferably carried by an adjustable section G. The face of the lens E that is toward the eye-lens F is preferably, though not necessarily, flat and is covered by a sheet or plate H of transparent material, such as glass. Ordinarily considered, the elements E and H constitute a crossed or sectional lens, such as is well known to the art. Located between and thus supported upon the lens E are the cross-hairs I. By the term "cross-hairs" it is of course intended to signify the lines that are made to appear across the field of vision and without regard to their relative arrangement or their actual structure—that is to say, whether formed of spider-web, wire, or drawn upon the glass—these various forms being well known to the art and being ordinarily designated "cross-hairs." Now it will be apparent that the said cross-hairs will clearly appear in the field of vision, the sharp definition thereof and the correction of parallax being secured by the adjustment of the section G with the lens F. For the purpose of illuminating the said hair-lines an opening K is formed in one of the side walls of the tube D and is in alinement with the edges of the lens E and the plate H, thus admitting light into the lens transversely of the tube. As this light would ordinarily illuminate only the adjacent sides of the cross-hairs, and thus not indicate or show correct lines in the field of vision, means are also employed for reflecting the admitted light, said means consisting of a reflector or reflecting-surface L, formed upon the edges of the lens E and plate H and extending around the same, but of course terminating on opposite sides of the opening K, as shown at M. This reflecting-surface may be formed by means of silvering the edges of the lens and plate or in any other manner found suitable. By means of this combination of features the cross-hairs will be completely, evenly, and brilliantly illuminated, for the rays of light entering the aperture K will be refracted to the reflector and reflected thereby in all directions, thus striking the cross-hairs on all sides.

The employment of two comparatively thick pieces of glass for the lens E and plate H, as shown in the drawings, is advantageous, for the reason that their outer faces being out of focus any dust which may settle thereon will not be seen in the field of vision, the focus being of course on the cross-hairs.

Although but one embodiment of the invention has been illustrated, it will be readily seen that said invention is not limited solely to this one form, but that the same may be changed and modified in a variety of ways.

Having thus described my invention, what I claim as new, and desire to secure by Letters Patent, is—

1. In a telescope, the combination with a tube, of cross-hairs located therein, a transparent support for said hairs also located in the tube, said tube having an opening in its side walls that admits light to illuminate the cross-hairs, and a reflector for the light passing through the opening.

2. In a telescope, the combination with a tube, of cross-hairs located therein, a transparent support for said hairs also located in the tube, said tube having an opening in its side walls that alines with the edge of the support and admits light to illuminate the cross-hairs, and a reflector opposed to the opening and partially surrounding the support.

3. In a telescope, the combination with a tube, of a lens located therein, cross-hairs supported on said lens, said tube having an opening in its side wall that alines with the edge of the lens to admit light transversely of the tube, and a reflecting-surface surrounding a portion of the lens in opposition to the opening.

4. In a telescope, the combination with a tube, and lens system therein, of cross-hairs located on one of the lenses, said tube having an opening in its side wall that alines with the edge of the lens carrying the cross-hairs and admits light to illuminate the same, and a reflecting-surface formed upon the edge of said lens extending about the same and terminating on opposite sides of the opening.

5. The combination with a tube having an opening therein, of a transparent member disposed in alinement with the opening in said tube and provided with cross-lines, and a reflecting-surface upon the periphery of said member.

6. A lens having cross-hairs, and a reflecting-surface upon its periphery.

7. A lens comprising a convex outer face and a plane inner face provided with cross-lines, and a reflecting-surface upon a portion of the periphery of said lens.

8. A lens having cross-lines, and a silvered reflecting-surface upon a portion of the periphery thereof.

In testimony whereof I hereunto affix my signature in presence of two witnesses.

GEO. N. SAEGMULLER.

Witnesses:
MARSHALL W. WINES,
JOHN L. SAEGMULLER.